US007561537B2

(12) United States Patent
Schrader et al.

(10) Patent No.: US 7,561,537 B2
(45) Date of Patent: Jul. 14, 2009

(54) METHOD FOR ADHOC BUFFER (75) Inventors: Thies Schrader, Haslum (NO); Vegard Hammer, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 680 days.

(21) Appl. No.: 11/036,762

(22) Filed: Jan. 14, 2005

(65) Prior Publication Data

US 2005/0174951 A1  Aug. 11, 2005

(30) Foreign Application Priority Data

Jan. 16, 2004  (NO)  ................................. 20040218

(51) Int. Cl.
*H04L 12/16* (2006.01)
(52) U.S. Cl. .................. 370/261; 379/202.01
(58) Field of Classification Search ........................ None
See application file for complete search history.

(56) References Cited

U.S. PATENT DOCUMENTS

| | | | | |
|---|---|---|---|---|
| 5,642,156 A | * | 6/1997 | Saiki | ........................ 348/14.09 |
| 5,680,392 A | * | 10/1997 | Semaan | ........................ 370/261 |
| 5,903,629 A | | 5/1999 | Campbell, IV et al. | |
| 5,933,417 A | * | 8/1999 | Rottoo | ........................ 370/260 |
| 5,943,321 A | | 8/1999 | St. Hilaire et al. | |
| 6,195,117 B1 | * | 2/2001 | Miyazaki | ........................ 348/14.09 |
| 7,213,050 B1 | * | 5/2007 | Shaffer et al. | ........................ 709/204 |
| 7,328,264 B2 | * | 2/2008 | Babka | ........................ 709/226 |
| 2002/0085490 A1 | | 7/2002 | O'Neil | |

FOREIGN PATENT DOCUMENTS

| | | |
|---|---|---|
| EP | 0719044 A2 | 6/1996 |
| WO | WO 0165390 A1 | 9/2001 |

* cited by examiner

*Primary Examiner*—Chi H Pham
*Assistant Examiner*—Albert T Chou
(74) *Attorney, Agent, or Firm*—Oblon, Spivak, McClelland, Maier & Neustadt, P.C.

(57) ABSTRACT

The present invention discloses a method for connecting one or more systems to a user for automatic determination of which system the user may use to participate in a call. A predefined list of video conferencing systems and/or locations for each user is predefined and arranged in a prioritized order. When scheduling a meeting and/or a video conference, the predefined user lists are taken into account when selecting end-points and other resources involved in the meeting/conference. The selection process may be controlled by predefined rules also taking various system availability, network resources and the routes required for connecting the other systems in the conference into account The present invention also introduces presence applications to facilitate scheduling and set up of ad hoc meetings/conferences.

15 Claims, 5 Drawing Sheets

METHOD FOR ADHOC BUFFER

RELATED APPLICATION

This application claims priority under 35 U.S.C. § 119 or 365 to Norwegian Application No. 20040218, filed Jan. 16, 2004, the entire teachings of which are incorporated herein by reference.

FIELD OF THE INVENTION

The present invention relates to managing, scheduling and initiating audio/video conferences, and relates in particular to a flexible method for allocating mixed media conference resources between one or more users.

BACKGROUND

Conventional audio/video conferencing systems comprise a number of end-points communicating real-time video, audio and/or data streams over and between various networks such as WAN, LAN and circuit switched networks.

A number of audio/video conference systems residing at different sites may participate in the same conference, most often through one or more MCU's (Multipoint Control Unit) performing i.a. switching functions in order to allow the audiovisual terminals to intercommunicate properly.

As audio/video conferencing involves various resources and equipment interoperating simultaneously at different localizations and capabilities; there is a need for the possibility to manage the resources involved, both for scheduled and ad hoc audio/video conferences. The wording schedule, or scheduler, should also be understood as including setting up ad-hoc meetings or calls as resources used in ad-hoc calls also must be reserved to avoid interference by other conferences.

Audio/video conferencing systems are therefore often 'used in conjunction' with a resource scheduler. A resource scheduler is a module that is used for scheduling or booking resources at any given point of time. The resource scheduler will allow a user to request resource usage at a given point of time, and either allow or disallow the usage at that time. Resource schedulers are often used for scheduling the use of meeting rooms, network resources, video systems etc. The resource scheduler must be connected to a database containing updated information regarding all accessible resources, like MCU's, gateways, routers, end-points etc.

A resource scheduler may e.g. provide system and resource overview, allowing the user to create, edit, and delete reservations, reserve resources for dial-in participants and specify bandwidth and network settings. The resource scheduler may also support automatic call routing and automatic selection of point-to-point connection, 'or use of' one or more MCU's. The resource scheduler may operate on an intuitive web interface requiring no additional installation on the user terminal, other than a conventional web browser.

All major players now bring this kind of management software into the picture, which lets you manage ad hoc video conferences through web GUIs. All also let you schedule conferences; some working with Outlook, Lotus Notes calendars or with proprietary solutions. However, none of the players offer ad hoc audio/video conferencing in a true sense with an intuitive GUI. Normally, an ad hoc conference initiator has to verify whether the wanted participants are available. This verification will typically find place using other GUI's than the conference vendors GUI, or a telephone; after verification the ad hoc conference can be established using some kind of management software.

Typically an initiator of an ad hoc conference will, if using conference facilities as defined in the state of the art, have a GUI, familiar to the users of management tools as Outlook, Notes etc., with calendars showing resource allocation both with regard to conference equipment as well as with regard to meeting rooms. The establishing of the conference will have many features in common with the planning of meetings, thus the initiator has to find out whether the needed resources are available, and verify whether the wished conference participants are present. Thereafter a conference call can be established by, for instance, clicking on the phone numbers of the invited participants on a GUI. As pointed out above this is not in line with the expectation one has to the wording "ad hoc"; ad hoc should be as intuitive as using instant messaging (IM) or a telephone. Further, in case of an upcoming conference no notification will be given to the participants of the ad hoc conference, thus the ad hoc conference can be forced to interruption without any notification given to the participants.

Traditionally, within the state of the art, video conferences scheduled using the Conference Management Systems are planned ahead of time with a list of invited participants, a start time, and an end time. The Conference Management Systems will be responsible for checking available Video conferencing resources for the requested time, connect the invited participants at the start time given for the conference, and disconnect all the participants at the conference end time. By attempting to manage Ad Hoc audio/video conferences in the same environment, one needs to address certain new issues. As an Ad Hoc audio/video conference has no known end time, the Conference Management Systems cannot set up an end time for the audio/video conference resource in question, and hence cannot predict when the resources are ready for another conference.

One of the main problems is; how long does an Ad hoc conference last? Today, if one schedules a conference without having any end time, the resources will be locked for all upcoming schedules until the conference is ended. This is a problem, as one will seldom have any knowledge regarding the end time of a conference. If the ad hoc conference is given a fixed end time by one of the participants, or a fixed end time is forced upon the Ad Hoc Conference, the participants will be surprised when the conference automatically ends at the fixed end time, or is terminated due to other upcoming conferences, particularly if this happens without any natural break in the conference. It is an implicit characteristic of Ad Hoc Conferences that they should be flexible without the need for setting time constraints such as end time or start time. Further, resources should be easily accessible, and they should not block other upcoming conferences, nor reservations of other conferences. Still further, the participants of an Ad Hoc conference should have the quality and predictability of a scheduled conference; hence no surprising interruption should occur.

As there currently does not exist any flexible system fulfilling the requirement indicated above, a consequence is that the resource management of the video conference equipment is poor. Based on experience people tend to book video conferences for a longer period of time than necessary, just to make sure that they have the necessary resources available, thus occupying video conference resources after their meeting has ended. In the worst case scenario one will have a lot of audio/video conferencing facilities that are unused, while at the same time having people who need the facilities, because the Management Systems is not updated and hence is shown as occupied even if it is free. Thus, there is a need for a sophisticated solution permitting a more flexible use of the audio/video conference resources.

SUMMARY OF THE INVENTION

It is an object of the present invention to provide a method avoiding the above described problems.

The features defined in the independent claims enclosed characterize this method.

In particular the present invention discloses a flexible method for allocating mixed media conference resources where the conferences use packet- and/or circuit-switched networks for communication between one or more users, allocating the conference resources to a first conference session for a first period of time, $\theta_1$, having a start time $t_1$ and an end time $t_2$, implying $t_1+\theta_1=t_2$, provided that a first start up condition of $t_1+\theta_1<t_3 \Rightarrow t_1<t_3-\theta_1$ is met, where $t_3$ is a start up time of a second conference, using one or more of the same resources, and the end time $t_2$ is dynamically and automatically extendable, hence resources are allocated for the first conference when one of the following conditions is met:

a) $t_1+\theta_1=t_3 \Rightarrow t_1=t_3-\theta_1$ implying a notification to the participants of the first session that the end time of the first session will be set equal to, or substantially equal to $t_3$, or b) $t_1+\theta_1>t_3>t_1 \Rightarrow t_3>t_1>t_3-\theta_1$ implying a notification to the participants of the first session that the end time of the first session will be set equal to, or substantially equal to $t_3$, or c) $t_1+\theta_1<t_3 \Rightarrow t_1<t_3-\theta_1$ and the method is further specified in that repetitive conditional testing is automatically executed by a conference management administrator or a management system with a periodical repetition interval of $\Delta t$ so as to maintain the resources for the first conference without interference with the second conference.

BRIEF DESCRIPTION OF THE DRAWINGS

In order to make the invention more readily understandable, the discussion that follows will refer to the accompanying drawings.

DETAILED DESCRIPTION OF THE INVENTION

In the following, the present invention will be discussed by describing a preferred embodiment, and by referring to the accompanying drawings. However, people skilled in the art will realize other applications and modifications within the scope of the invention as defined in the enclosed independent claims.

The main goal of the present invention is to add flexibility into audio/video conferencing systems, hence increasing the use of such systems, as well as decreasing the time the audio/video conferencing systems are booked but not in use.

In the following the wording "mixed media" should be understood as sound data, picture data; either still pictures or video, exchange of any other digital data or any combination thereof.

To achieve a more widespread use of video conferencing systems, one needs a much simpler and more predictable ad hoc service. Whenever a person wants to use video conferencing facilities, as long as there are resources available, independent of scheduled conferences, he/she must be given audio/video conference resources. Numerous problems have to be solved to accomplish this task; how to schedule the unscheduled ad hoc conferences, how to update the Conference Management Systems both with regard to the ad hoc conferences as well as with regard to scheduled conferences that are finished before planned, or scheduled conferences that are extended beyond the allocated amount of time, how to know if the invited participants are at their desks, are available on PC, phone, or on traditional video conference equipment. From the instant messenger applications it is known to detect whether there has been any activity on a personal computer, client or the like, hence one has a presence indication, thus a first person who invites a second, a third, a fourth person etc. using instant messenger, has indications regarding the presence of the second fourth person, hence the first person can establish ad hoc chatting with the invited persons based on these indications. Within chatting, resource allocation is seldom a problem, as long as the persons of interest are available and have the applications needed installed on their computer or the like, one can establish an electronic communication; such is not the case within more advanced audio/video or multimedia conferencing. As indicated above there are many problems that have to be solved.

- One needs a method that indicates whether resources, human or others, are available at any given time.
- One needs a flexible method for allocating mixed media conference resources where the conferences utilize packet and/or circuit switching for communication between one or more users specified in that a user establishing a first conference session can monitor the availability of other users sharing a common notification server, by monitoring whether there has been any activity on a personal computer, client or the like for a particular period of time.
- One needs a method that can establish ad hoc conferences without interfering with scheduled conferences.
- One needs a method that can establish scheduled conferences without interfering with ad-hoc conferences.
- One needs a method that can release resources from finished conferences, even though they are ended before the scheduled end time.
- One needs a method that notifies the participants of an ad hoc conference before disruption due to upcoming scheduled conferences.
- One needs a method that notifies the participants of an extended scheduled conference before disruption due to other upcoming scheduled conferences.

All the addressed needs pointed out above are met by the concept of the time buffer. The idea is to reserve a fair amount of time for an ad hoc conference, or to protect ongoing conferences or scheduled conferences with a protectional prebuffer attached to the ongoing or scheduled conference, given a start time earlier than the start time of the ongoing, or scheduled conference, and further to apply a set of rules that secure the duration of an ad hoc conference. The ad hoc conference should, for the user, not appear as having an end time, as long as no scheduled conferences are conflicting with the ad hoc conference.

The concept of adding time buffers to ad hoc conferences or to any other conference can, according to the present invention, be expressed by the following mathematical expressions:

General expressions for valid start-up conditions for a conference session according to the present invention:

$$t_1+\theta_1 \leq t_3 \lor t_1+\theta_1 > t_3 > t_1 \quad (1.1)$$

A general expression for run time conditions of a current, or ongoing conference, according to the present invention, is given below; the expression is expressing conditions necessary for running a conference, further the conditional tests will be executed with a repetitive interval period of $\Delta t$, hence the conditional test will be executed at $n \cdot \Delta t$, where n is a positive integer, $$t_c+\theta_1+\Delta t < t_3 \lor t_c+\theta_1+\Delta t \geq t_3 > t_c \quad (1.2)$$

At last, we have mathematically expressed, according to the present invention, one of the conditions for termination of a ongoing conference session and updating of the conference management system, the test is the same as above and it is executed every $n \cdot \Delta t$:

$$t_c \cong t_3 \quad (1.3)$$

Where, $t_1$: is the starting time of a first ad hoc conference session,
$t_2$: is a finishing time of a first ad hoc conference,
$t_3$: is the starting time of a second conference session,
$t_4$: is the starting time of a prebuffer, added to already established or scheduled conferences,
$\theta_1$: is the length of prebuffers, or it is a "preset" length of conferences without scheduled end time, and
$\Delta t$: is a value for repetition intervals for conditional testing of run time condition for a current session.

A FIRST PREFERRED EMBODIMENT OF THE INVENTION

Figure 1A:
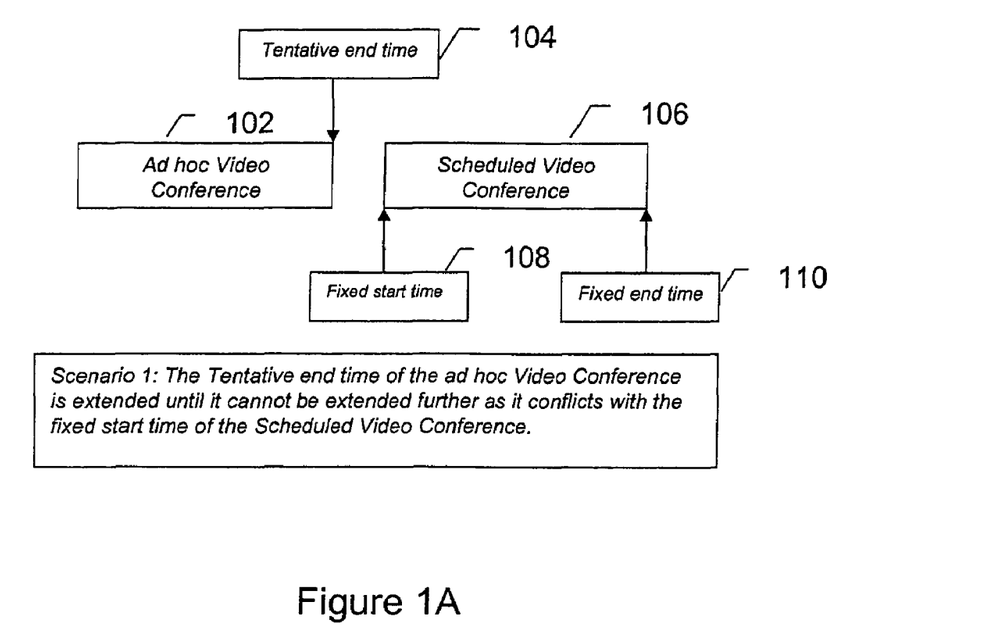
FIGS. 1A and 1B illustrate schematically two scenarios within ad hoc conferencing according to the present invention.
Figure 1B:
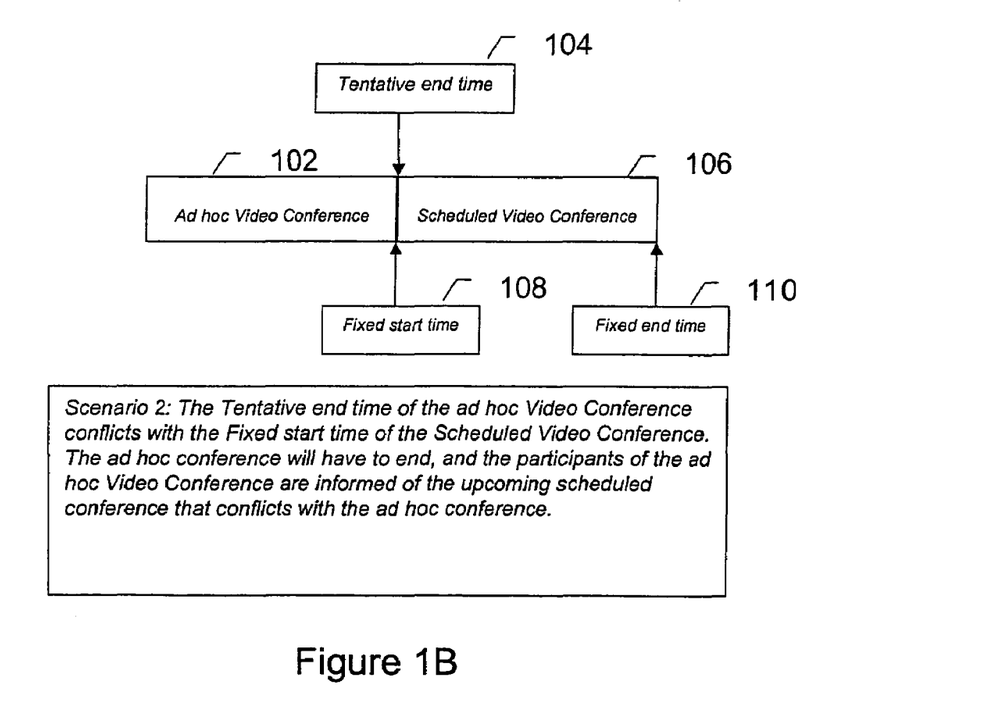

With reference to FIG. 1A the first scenario shown, when a user starts a conference 102 according to the present invention, the conference will be scheduled with a start time that will be the present time, $t_1$, and a tentative end time 104, $t_2$. Further, the length of the session will be: $t_2-t_1=\theta_1$. A first period of time $\Delta t$ into the conference the management system according to the present invention will, attempt to extend the end time, $t_2$ with a period $\Delta t$. If there are no upcoming conferences that will conflict with the new end time, $t_2$, of the ad hoc conference 102, then the end time, $t_2$, will be moved without the participants being alerted. If, however, referring to the second scenario (FIG. 1B), the new end time 104, $t_2$ conflicts with an upcoming scheduled conference 106, the new end time, $t_2$, will be set to the start time 108, $t_3$, of the second conference 106, and the participants of the ad hoc conference 102 will be notified about termination of the conference and about the end time 104, $t_2$. The conditions for starting up an ad hoc conference according to the first embodiment is satisfied by the equation (1.1), however, by analyzing the border conditions of this expression one can add particular actions to particular solutions of the expression as given by (1.1):

$$t_1+\theta_1 < t_3 \quad (1.1a)$$

$$t_1+\theta_1 = t_3 \quad (1.1b)$$

$$t_1+\theta_1 > t_3 > t_1 \quad (1.1c)$$

If the condition of (1.1a) is met, one will allocate resources for a new mixed media conference having a first duration of a new conference session $\theta_1$. If the condition of (1.1b) is met one will allocate resources for a new mixed media conference where a fixed end time of the session will be set as $t_3$, or substantially equal to $t_3$, thus $t_2 \cong t_3$. Further, the participants taking part in this new conference session will be notified of the fixed end time. If the condition set forth by (1.1c) is met, the same actions as when (1.1b) is satisfied, will be executed, however, there will be a possibility for the conference management system, or for the conference management administrator to reject such a new conference, particularly if the difference between $t_3$ and $t_1$ is small.

After the establishment of the new conference session, tests have to be executed so as to prevent the ongoing conference from interfering with other sessions having higher Or equal priority, or already scheduled conferences. These tests follow the expression (1.2), however each of the three possible results of the conditional tests will prevail its own action. Given the expression of $t_c+\theta_1+\Delta t < t_3$ this will keep the session going without any of the participants noticing that a conditional test has been executed. If the condition $t_c+\theta_1+\Delta t < t_3$ is met, one will allocate resources for the mixed media conference where a fixed end time of the session will be set to $t_3$, or substantially equal to $t_3$, thus $t_2 \cong t_3$. Further, the participants taking part in this conference session will be notified of the fixed end time. The last expression deduced from (1.2) is $t_c+\theta_1+\Delta t > t_3 > t_c$; when this condition is met one will allocate resources for the mixed media conference where a fixed end time of the session will be set to $t_3$, or substantially equal to $t_3$, thus $t_2 \cong t_3$. Further, the participants taking part in this conference session will be notified of the fixed end time, however if $t_c+\Delta t \geq t_3$ one will inform the participants taking part in the conference that it will be terminated shortly and preferably before an extra $\Delta t$ period. If the ongoing conference has a higher or equal priority than the conference scheduled to start at $t_3$, then the conference management system can give runtime priority to the ongoing conference, thus rejecting the scheduled one.

The last of the conditions, expressed as (1.3) will, at least if the session with the start up time $t_3$ has a higher priority, be terminated, thus releasing conference resources, further the conference management system will be updated.

Regarding which conference has the higher priority, this is not of any importance for this invention, and it is quite simple to set up algorithms supporting a hierarchical priority system for conference resources. The main idea addressed by the present invention is the use of timing buffers.

A SECOND PREFERRED EMBODIMENT OF THE INVENTION

Another way of achieving the same result would be not having any end time, $t_2$ set for the ad hoc conference. When a user tries to schedule a conference while another conference sharing the same resources is in progress, the Conference Management Systems will not allow the conference start time of the new conference, $t_1$ to be closer to the current time $t_c$, than a default period of time, $\theta_1$, for ad hoc conferences.

If the duration for the ad hoc conference conflicts with an upcoming scheduled conference, then the ad hoc conference end time, $t_2$ will be set to the start time of the upcoming scheduled conference. The participants of the ad hoc conference will be alerted of the end time, $t_2$. This will only happen if $t_2$ causes the conference to have duration less than the set buffer amount of time.

Figure 2:
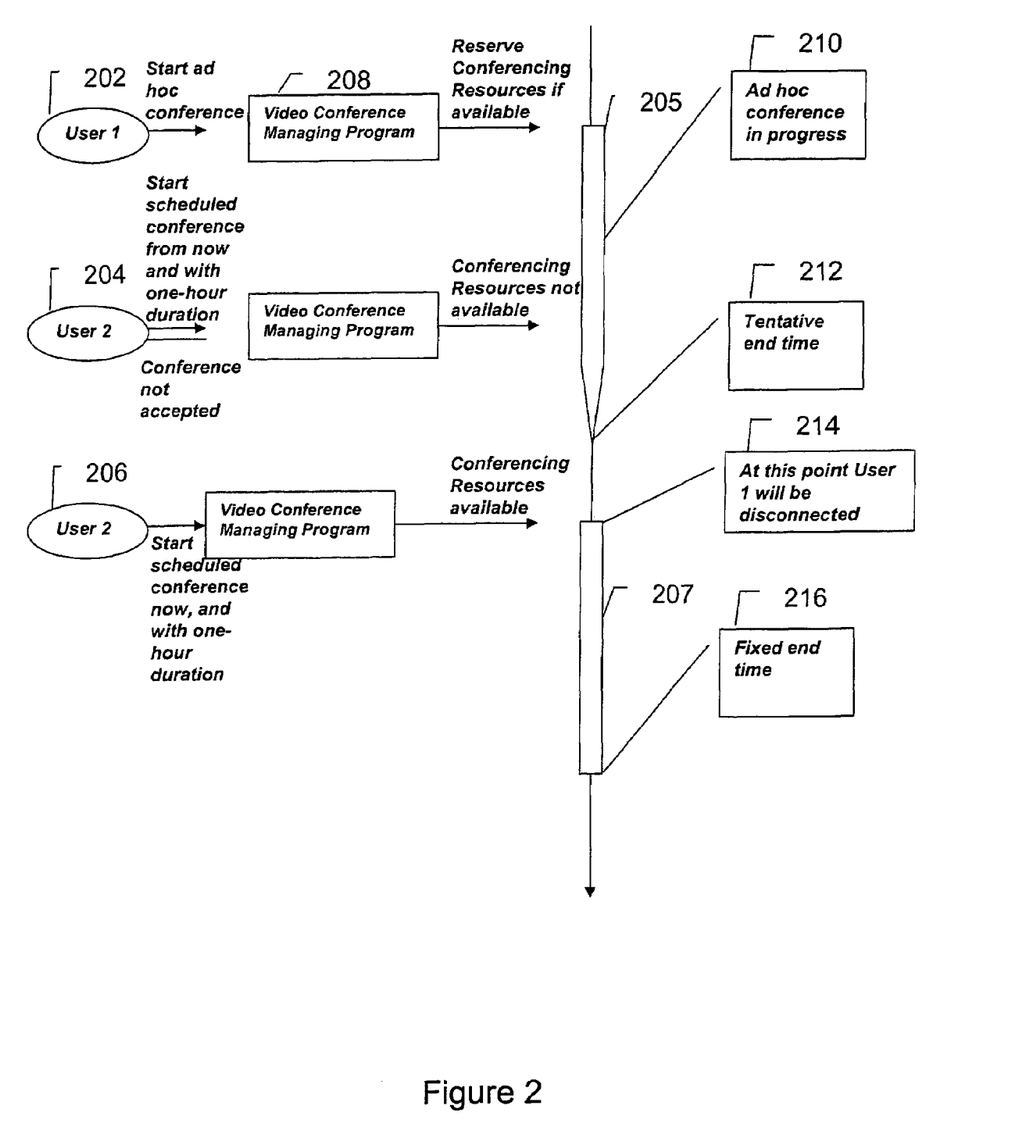
FIG. 2 illustrates a use case for establishment of an ad hoc conference according to the present invention.

A practical example of the latter method involving two users; a first user 202 establishing an ad hoc conference 205 and a second user 204 who attempts to establish a scheduled conference 207 using video conference managing program 208, is shown in FIG. 2. It can be seen from this figure that the second user cannot establish a scheduled conference with a start time that is in conflict with an ongoing conference in progress 210, either the ongoing conference is a scheduled one or an ad hoc conference according to the present invention. The second user 204 will manage to establish his conference when the start time 214 of his conference is greater than or equal to the current time added with a default or preset value for the length 212 of the first session 205.

In fact this second embodiment can be expressed as a special case of the first embodiment, where $\Delta t \rightarrow 0$, hence we will have a continuous conditional testing. Thus, the expression for the run time situation for an ongoing conference will be simpler and more intuitive. The expressions according to the second embodiment of the present invention will be:

$$t_c + \theta_1 < t_3 \lor t_c + \theta_1 \geq t_3 > t_c \quad (1.4)$$

This expression will as for the previous example result in three conditions; each of the three will be met by the same actions except for the situation where $t_c + \Delta t \geq t_3 \approx t_c \geq t_3$ an abrupt termination will occur of the ongoing conference. However, this situation is only of theoretical interest as long as the ad hoc call will be rejected during its creation—as it will try to use resources already booked for a conference.

A THIRD PREFERRED EMBODIMENT OF THE INVENTION

Using the basic idea of timing buffers, one can imagine a solution where each scheduled conference has a buffer in front of its start time $t_1$. This buffer will be of a length default, or eligible, and when an ongoing conference conflicts with this prebuffer the participants of this ongoing conference will be notified by the Conference Management System. This notification will inform the participants of the ongoing session about termination of the session within a specific period of time, the time being equal or shorter than the length of the prebuffer.

As is evident from the above, one of the main concepts of the present invention is the addition of buffers, either it be added to an ongoing conference at its end time, or the buffer will have its start time subtracted from a scheduled conference start time—a prebuffer, i.e. a buffer having a start time earlier than its corresponding conference. The basic idea is the same; adding flexibility to audio/video conferencing systems by protecting conferences against disruption.

A practical and more specified example of the third embodiment is given below:

A scenario involving establishment of mixed media communication between one or more users utilizing circuit switched or packet switched network in a conference, is described as a two step method where the first step comprises;
a flexible method for allocating conference resources for a
  first period of time, $\theta_1$, having a start time $t_1$, and an end time $t_2$, where the end time $t_2$ does not interfere with a scheduled conference using the same resources, and the end time $t_2$ is dynamically and automatically extendable,
if $t_c$ reaches a prebuffer time $t_3-\theta_1$, where the prebuffer time $t_3-\theta_1=t4$ is a period of time in front of a second conference starting time, $t_3$, having a higher or equal priority than the first conference session, the participants of the first session are notified about the upcoming second conference and a new end time, $t_2$, is established for the ongoing first session.

In fact the third embodiment of the present invention can be expressed with the same mathematical expressions as the first general expression, where $\Delta t \rightarrow 0$, since, $$t_1 + \theta_1 < t_3 \Rightarrow t_1 < t_3 - \theta_1$$

$$t_1 + \theta_1 = t_3 \Rightarrow t_1 = t_3 - \theta_1$$

$$t_1 + \theta_1 \leq t_3 \Rightarrow t_1 \leq t_3 - \theta_1$$

thus, having a buffer before or after a conference session is two aspects of the same basic idea. Further, the testing conditions will be as for the second embodiment. To make it more intuitively understandable a reformulation of the expressions (1.4) is shown as $$t_c < t_3 - \theta_1 \lor t_3 > t_c > t_3 - \theta_1, \quad (1.5)$$

this expression can be seen as $t_3$ being the start time of a new session, $t_c$ is the current time or the real time $\theta_1$, being the length of a buffer in front of $t_3$. The conditions for allocation of conference resources are the same as for the second embodiment, further the run time conditions and the terminating conditions are analogue to those shown for the second embodiment.

Common Features Regarding the Three Embodiments

In a scenario where the first conference can continue without any conflict to other conferences the run time conditions will be as follows:
the first conference session is finished before reaching the end time $t_2$ and/or before reaching a prebuffer time, $t_3-\theta_1=t_4$, where the prebuffer time $t_4$ is a period of time $\theta_1$ in front of a second conference starting time, $t_3$, of a second conference having a higher or equal priority than the first conference session, alternatively the first conference session is finished before the buffer added to $t_1$, the timing advance buffer, reaches $t_3$ where the $t_3$ is the starting time of a new conference having the same, or higher, priority than the first conference session, then resources allocated for the first conference session will be released and a conference management system will be updated.

Figure 3:
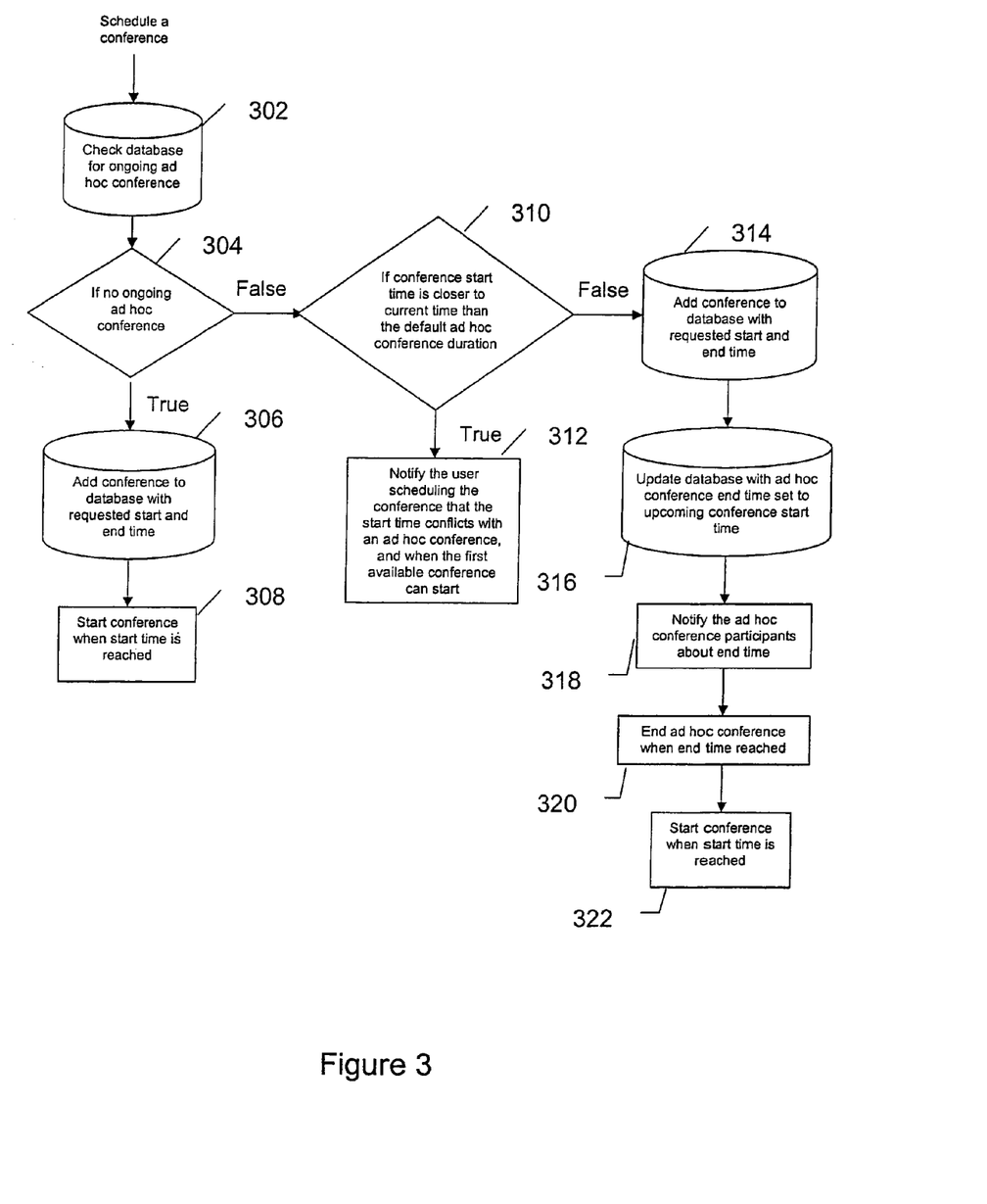
FIG. 3 is a flow sheet illustrating the steps of a method for registering a scheduled conference according to one aspect of the present invention.

FIG. 3 illustrates a flow sheet for registering a scheduled conference according to one aspect of the present invention. Upon the user attempting to schedule a conference, a conference database is checked for presence of ongoing ad hoc conference(s) at 302. If no ongoing ad hoc conference exists at 304, then requested conference is scheduled by adding it to the conference database with the requested start and end times at 306. At 308, the scheduled conference starts when the start time is reached.

If at 304 there exists an ongoing ad hoc conference, then at 310 a check is made to determine if the conference start time is closer to the current time than a default ad hoc conference duration. If true, then at 312 the user scheduling the conference is notified that the start time conflicts with the ad hoc conference, and given an indication when the first available conference can start. If false at 310, then the requested conference is added to the database with the requested start and end times at 314. At 316, the database is updated with the ad hoc conference end time set to the upcoming conference start time. The ad hoc conference participants are notified of the new end time at 318. At 320, the ad hoc conference ends at the end time and at 322, the scheduled conference begins at the start time as scheduled.

Figure 4:
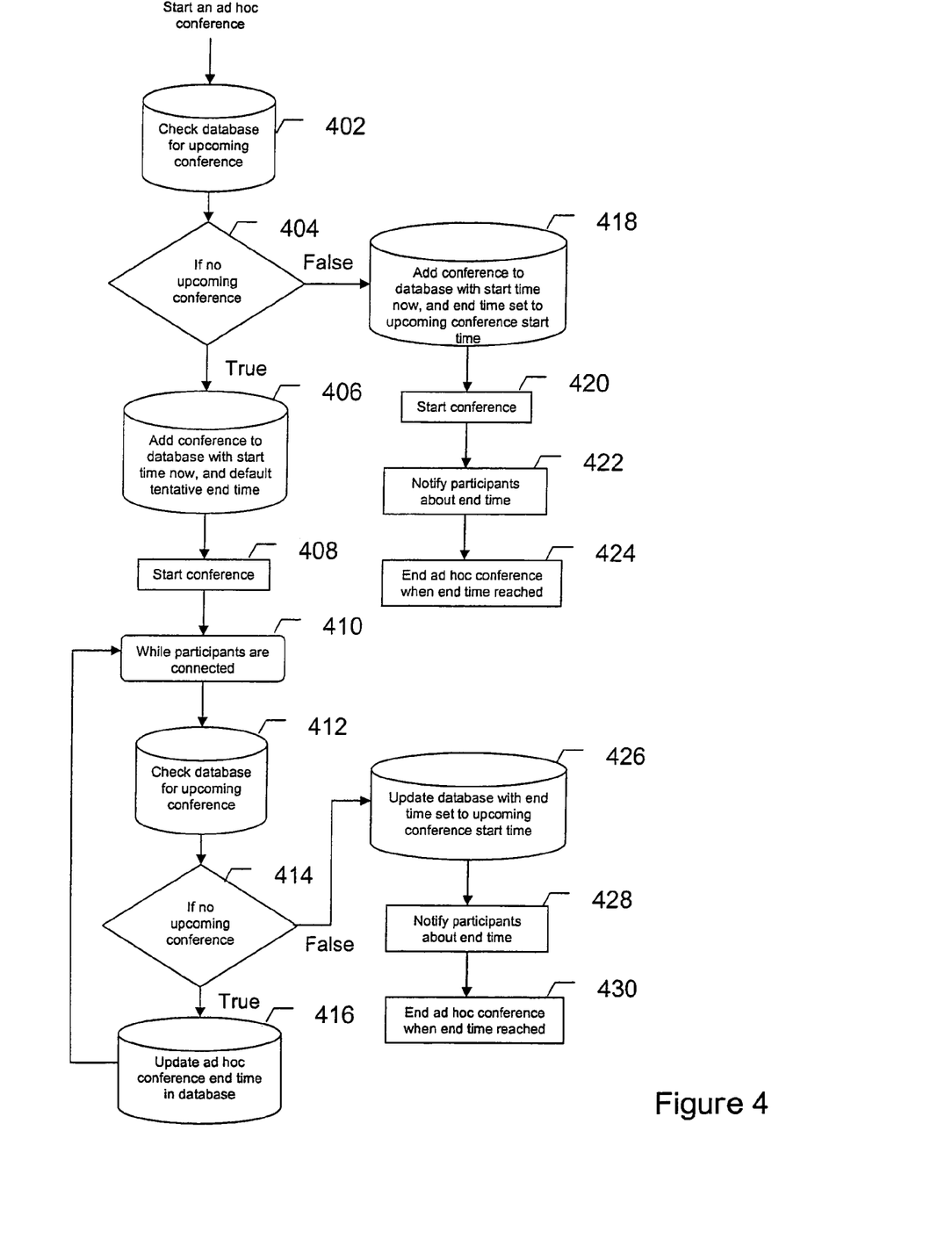
FIG. 4 is a flow sheet illustrating the steps of a method for starting an Ad Hoc Conference according to one aspect of the present invention.

FIG. 4 illustrates a flow sheet for starting an ad hoc conference according to another aspect of the invention. At the start of an ad hoc conference, a conference database is checked at 402 to determine if an upcoming conference is scheduled. If at 404 there is an upcoming conference, then at 418 the requested ad hoc conference is added to the database with a start time of the current time, and an end time set to the upcoming conference start time. With start of the ad hoc conference at 420, the participants are notified about the end time at 422. The ad hoc conference is ended when the end time is reached at 424.

If there is currently no upcoming conference at 404, then at 406 the ad hoc conference is added to the database with a start time of the current time and a default tentative end time. Upon start of the ad hoc conference at 408, a loop of processing steps 412, 414, 416 is entered. At 412, the database is checked for existence of upcoming conference. If no upcoming conference is determined at 414, then at 416 the end time of the ad hoc conference is updated in the database and control loops back to 412.

If at 414 there is an upcoming conference, then at 426 the database is updated to set the end time of the ad hoc conference to the upcoming conference start time. At 428, the ad hoc conference participants are notified about the end time adjustment. At 430, the ad hoc conference ends when the end time is reached.

Advantages

As more and more users use audio/video conferencing as an ad hoc communication tool, there is an increasing need for Conference Management Systems that manage such conference types. Users making ad hoc calls are often disconnected abruptly when a Conference Management System disconnects the conference in order to make place for a scheduled conference. Using an algorithm based real-time extension of tentative end time; the user is able to make safe ad hoc conferences without blocking audio/video conference resources for any future schedules.

The present invention introduces a method for determining the end-point that is best suited for use by a user. This method takes into consideration user preferences, availability of systems, etc.

A first aspect of the present invention reduces the need for human knowledge of user equipment when scheduling conferences and/or meetings, as the system selects the best suited system automatically; however, the problem of not knowing the availability of the actual participants when scheduling ad hoc conferences still remains.

The present invention includes a second aspect introducing a presence system connected to scheduling and automatic connection of conference service. Presence applications are known as applications indicating whether someone, or something, is present, or not. A so-called "buddy list" on a user terminal shows the presence of the people, or systems (buddies), that have been added to the list. The list will indicate if the "buddy" is present, or not (logged on the computer, working, available, idle, or another status). The presence functionality creates a feeling of presence, also with people or things that are located in other buildings, towns, or countries.

Presence applications are often found in conjunction with Instant Messaging (IM) applications. These applications extend the presence application by adding the possibility of exchanging information between present "buddies". The information exchange may include applications like chat, messaging and conferencing.

In Presence and IM applications, there is a central server keeping track of all the clients in the system, while the client provides the server with information about their own state and location. The server also handles user login and provides information of the "buddies" in respective "buddy list" by using a proprietary protocol. However, information between clients ("buddies") may be transmitted directly as the server provides connection information (IP address and port number) of the client's "buddies".

By connecting a presence or IM application to the resource scheduler, a first user will be able to see when a second user is present (not busy with something else), and at the same time, an idle system may be selected according to the automatic system selection system of the second user. This will provide a new ad hoc possibility to common resources, as unnecessary calls (due to ignorance of presence information) will be avoided and manual negotiations through alternative communication prior to the call will not be required. Both user presence and system availability will be shown in one interface.

The connection between the presence application and the resource scheduler may appear for the users in many ways. The most convenient would probably be to integrate the resource scheduler in the IM/Presence application or vice versa. Hence, allowing the user to see the presence of both the user and system. A double click on a "buddy" in a "buddy list" may e.g. execute an immediate initiation of a call set up to the "buddy", using the most preferred idle system associated with the "buddy". A click on further "buddies" preferably includes them in the call constituting a conference, all provided by the functionalities already available in the resource scheduler. The resource scheduler may be instructed by requests from the presence application using the proprietary protocol. Alternatively, all or some of the conference features available in the resource scheduler may be integrated as IM functions in the presence application. The ordinary scheduler interface will then be replaced by the GUI of the presence application initially downloaded from the server.

Figure 5:
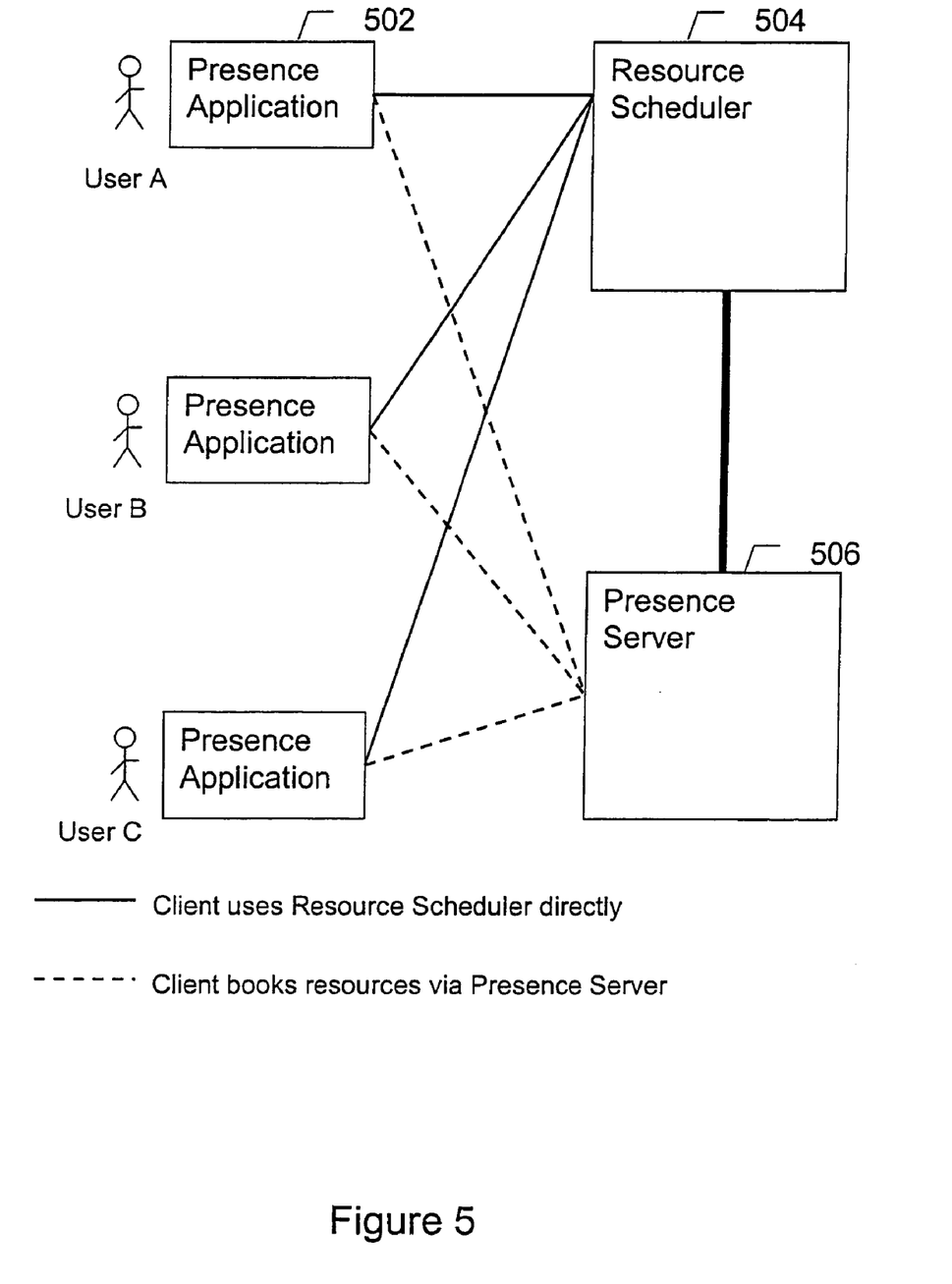
FIG. 5 is a block diagram that illustrates the connection between the resource scheduler, presence application and presence server.

The presence application, resource scheduler and the prioritizing mechanism may be further integrated in that the above-discussed server is being utilized for supporting the selection procedure of the resource scheduler. Generally, the information required for the selection procedure to work has to be distributed. Such information may include system availability, qualified numbers, capabilities, usage cost, location and priority lists. This information needs to be published to a distributed information center. According to the present invention, this center may be the presence server, as this server already stores information about the users or "buddies". The selection procedure then utilizes the information stored in the distributed server to determine which systems to use when setting up a conference. The presence application will then be responsible for maintaining system information on the server. The presence application will also request system information from the server when the user issues a conference request. The presence application will retrieve information about other participants from the server, and provide this information for the resource scheduler, and the resource scheduler will initiate the conference with the participants from the presence application. The connection between the resource scheduler 504, presence application 502 and presence server 506 is shown in FIG. 5. The unbroken lines and dotted lines illustrate one alternative in which the presence applications 502 communicate both with the resource scheduler 504 and the presence server 506 independently. In another alternative, the presence applications 502 communicate with the presence server 506 directly, whereas the presence server 506 communicates with the resource scheduler 504.

The present invention provides many advantages in connection with scheduling and set-up of calls and conferences. As an example, a user does not need to know which systems other users can access. By the means of the prioritizing mechanism, there is no need for users to know which systems to book when having a conference with a given person. With the present invention, all the user has to do is to select the person, and the system itself selects the correct system to use for that person by utilizing the associated priority list in addition to other resource availability, system capabilities, location of user, etc.

In addition, as the use of common resources often occur in an ad hoc fashion—the connection of presence applications and Instant Messaging with conferencing resource availability according to the present invention will create an environment for easily starting ad-hoc conferences. The user no longer has to check multiple systems and persons for availability, but can just wait until a user with a compatible system is available, and click "conference".

Also, by the introduction of presence and IM, initiating a call with another user, or including a user in an already established conference, will be easy and intuitive, as one can simply double click the link of the wanted and present user included in the "buddy list" of the presence or IM application.

Those skilled in the art should readily appreciate that the present conferencing approach described herein is deliverable to a computer in many forms, including byt not limited to a) information permanently stored on non-writable storage media such as ROM devices, b) information alterably stored on writable storage media such as floppy disks, magnetic tapes, CDs RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for allocating mixed media conference resources for a conference using packet- and/or circuit-switched networks for communication between one or more users, comprising:

allocating, with a conference management system, the conference resources to be used in a first adhoc conference session for an adjustable first period of time, $\theta_1$, said first adhoc conference session having a start time $t_1$ and a tentative end time $t_2$, wherein $t_1+\theta_1=t_2$, provided that a first start up condition of $t_1+\theta_1<t_3$ or $t_1+\theta_1>t_3>t_1$ is met, where $t_3$ is a start up time of a second conference using one or more of the conference resources to be used in the first adhoc conference session, and the end time $t_2$ is dynamically and automatically adjustable;

adjusting, with the conference management system, the tentative end time for the first adhoc conference session when one of the following conditions is met:

$t_1+\theta_1>t_{3>t1} \Rightarrow t_3>t_1>t_3-\theta_1$, wherein the adjusting includes providing a notification to the participants of the first session that the tentative end time of the first session will be adjusted to be no later than $t_3$, or $t_1+\theta_1<t_3 \Rightarrow t_1<t_3-\theta-_1$ wherein the adjusting includes adjusting the tentative end time to be no later than $t_3$;

storing, in a memory device, the tentative end time after the adjusting; and automatically executing, with the conference management system, repetitive conditional testing by a conference management administrator or a management system with a periodical repetition interval of $\Delta t$ so as to maintain the resources for the first adhoc conference without interference with the second conference.

2. The method according to claim 1, further comprising:

establishing a new parameter $t_c$ with respect to $t_3$, where $t_c$ is a real time;

testing expression $t_c+\theta_1+\Delta t$ against smaller than, equal to, or greater than $t_3$, if the expression is smaller than $t_3$, the first adhoc conference can be allocated resources for an extra $\Delta t$ of time, if the condition $t_c+\theta_1+\Delta t \geq t_3>t_c+\theta_1$ is met, then let $t_2=t_3$ and notify the participants of the new fixed end time $t_2$, and if $t_c+\theta_1+\Delta t>t_3 \leq t_c+\theta_1$ is met, the first adhoc conference session is terminated and the resources allocated for the first adhoc conference session are released and a conference management system is updated.

3. The method according to claim 2, wherein the periodical repetition interval $\Delta t$ meets the condition: $\Delta t \rightarrow 0$.

4. The method according to claim 2, wherein if the first adhoc conference session is terminated by one of the participants in said session before reaching the end time $t_2$, or if the condition $t_c+\theta_1 \leq t_3 \Rightarrow_{tc} \leq t_3-\theta_1$ is satisfied, the resources allocated for the first adhoc conference session are released and the conference management system is updated.

5. The method according to claim 2, further comprising:

adding the $\theta_1$ as a buffer to $t_c$, or to $t_1$ as an initial condition, or as a buffer added before a starting time $t_3$ of a second scheduled conference giving a prebuffer start time $t_{3-1}=t_4$, where the, $\theta_1$, addition to $t_1$, $t_c$ or the subtraction of $\theta_1$, to $t_3$ is ensuring allocation of conference resources to be shared without any interference between conferences.

6. The method according to claim 5, further comprising:

calculating the prebuffer start time $t_4$ using the conference management system and satisfying that the condition 'prebuffer start time'+'buffer length' is equal to the scheduled conference start time.

7. The method according to claim 1, further comprising:

setting the first period of time, $\theta_1$, by a conference management system or a conference management administrator.

8. The method according to claim 1, further comprising:

adjusting the end time, $t_2$, by a conference management system or a conference management administrator.

9. A method according to claim 1, wherein the second conference session is a scheduled conference session.

10. The method according to claim 1, further comprising:

monitoring an availability of other users sharing a common notification server, by monitoring whether there has been any activity on a computer or client for a particular period of time.

11. The method according to claim 1, wherein the first adhoc conference session or the second conference session is a conference session using video conference facilities.

12. The method according to claim 1, wherein the first period of time, $\theta_1$, is a preset default value.

13. The method according to claim 1, wherein the end time, t2, is a preset default value.

14. The method of claim 1, wherein the conference management system includes a processor configured to execute a resource scheduler that schedules or books resources for use in the conference.

15. A computer readable storage medium encoded with instructions which when executed by a processor in a conference management system, causes the processor to implement a method of allocating mixed media conference resources for a conference using packet- and/or circuit-switched networks for communication between one or more users, the method comprising:

allocating, with the conference management system, the conference resources to be used in a first adhoc conference session for an adjustable first period of time, $\theta_1$, said first adhoc conference session having a start time $t_1$ and a tentative end time $t_2$, wherein $t_1+\theta_1=t_2$, provided that a first start up condition of $t_1+\theta_1 \leq t_3$ or $t_1+\theta_1 > t > t_1$ is met, where $t_3$ is a start up time of a second conference using one or more of the conference resources to be used in the first adhoc conference session, and the end time $t_2$ is dynamically and automatically adjustable;

adjusting, with the conference management system, the tentative end time for the first adhoc conference session when one of the following conditions is met:

$t_1\theta_1 > t_3 > t_1 \Rightarrow t_3 > t_1 > t_3-\theta_1$, wherein the adjusting includes providing a notification to the participants of the first session that the tentative end time of the first session will be adjusted to be no later than $t_3$, or $t_{1+\theta1} < t_3 \Rightarrow t_1 < t_3-\theta_1$, wherein the adjusting includes adjusting the tentative end time to be no later than $t_3$;

storing, in a memory device, the tentative end time after the adjusting; and automatically executing, with the conference management system, repetitive conditional testing by a conference management administrator or a management system with a periodical repetition interval of $\Delta t$ so as to maintain the resources for the first adhoc conference without interference with the second conference.

* * * * *